May 2, 1950     J. H. FEASTER     2,505,951
ROTARY ENGINE
Filed May 3, 1946     3 Sheets-Sheet 1
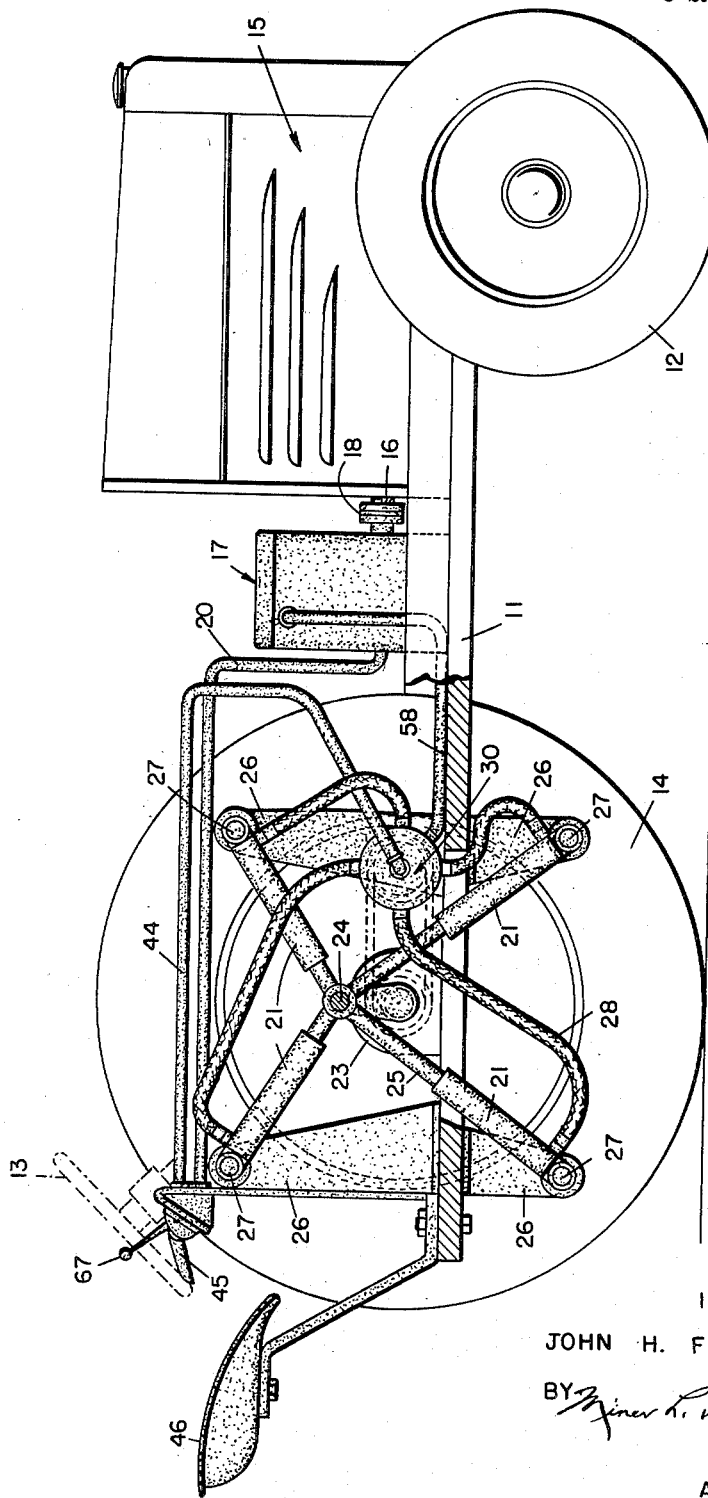
FIG. I.
INVENTOR
JOHN H. FEASTER
BY *Miner L. Hartman*
ATTORNEY

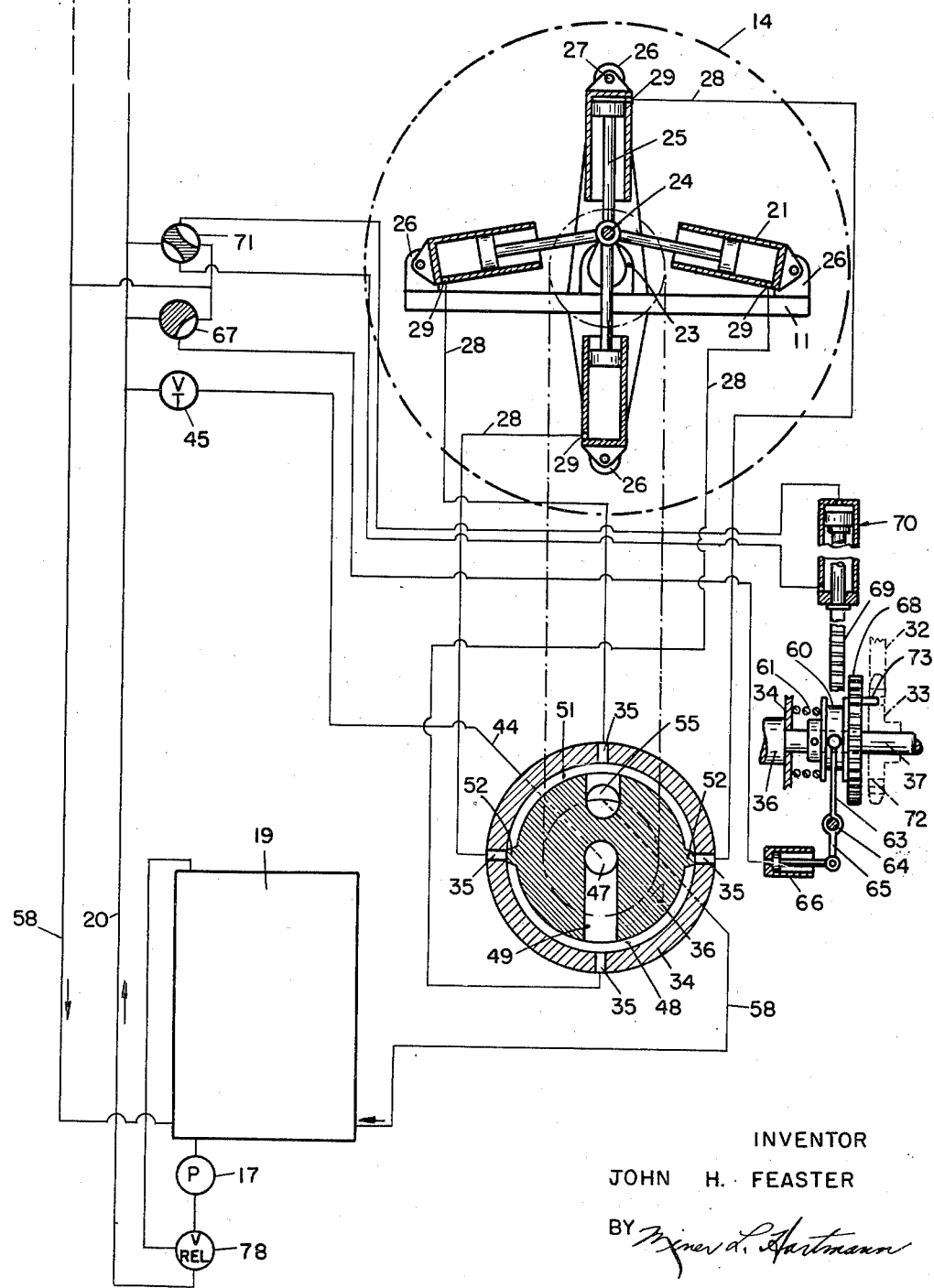

May 2, 1950    J. H. FEASTER    2,505,951
ROTARY ENGINE

Filed May 3, 1946    3 Sheets-Sheet 3

INVENTOR
JOHN H. FEASTER
BY
ATTORNEY

Patented May 2, 1950

2,505,951

UNITED STATES PATENT OFFICE 2,505,951

ROTARY ENGINE

John H. Feaster, Laguna Beach, Calif.

Application May 3, 1946, Serial No. 667,220

4 Claims. (Cl. 121—121)

This invention relates to fluid pressure motors and more particularly to those having radially arranged cylinders around a common shaft.

One object of the invention is to provide a new and improved construction and arrangement for the transmission of power whereby a fluid under pressure is controlled by a single rotary valve operated in synchronism with a crank shaft to actuate in sequence multiple single action pistons and cylinders which are arranged radially around a common shaft. Another object is to provide a high pressure fluid motor means for direct actuation of the driving wheels of a vehicle such as a tractor. Another object is to provide a single rotary valve structure to control the flow of pressure fluid to and from a multiplicity of single acting cylinders connected to a common crank shaft. Still another object is to provide a reversing mechanism for a radial cylinder motor.

These and other objects are attained by my invention which will be understood from the following description and the accompanying drawings, in which:

Fig. 1 is a side elevational view showing my fluid motor directly connected to one driving wheel of a tractor;

Fig. 6 is a diagrammatic view showing the arrangement of connecting lines for hydraulic fluid to the several parts of my motor including a plan view partly in section of the reversing mechanism shown in Fig. 3.

Figure 2:
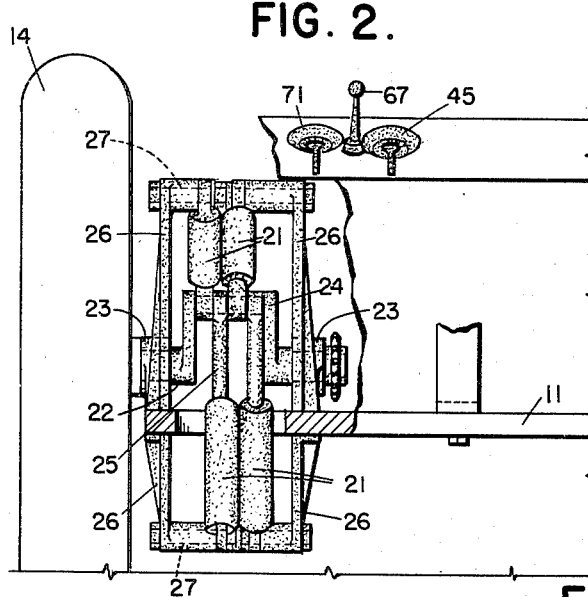
Fig. 2 is a rear end elevational view of the tractor with parts broken away to show the driving arrangement.
Figure 4:
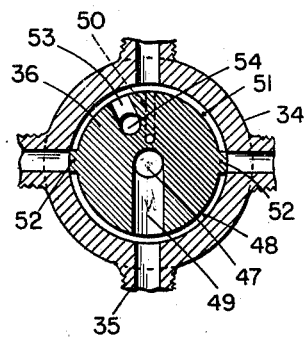
Fig. 4 is a cross-sectional view taken on the line 4—4 of Fig. 3.
Figure 3:
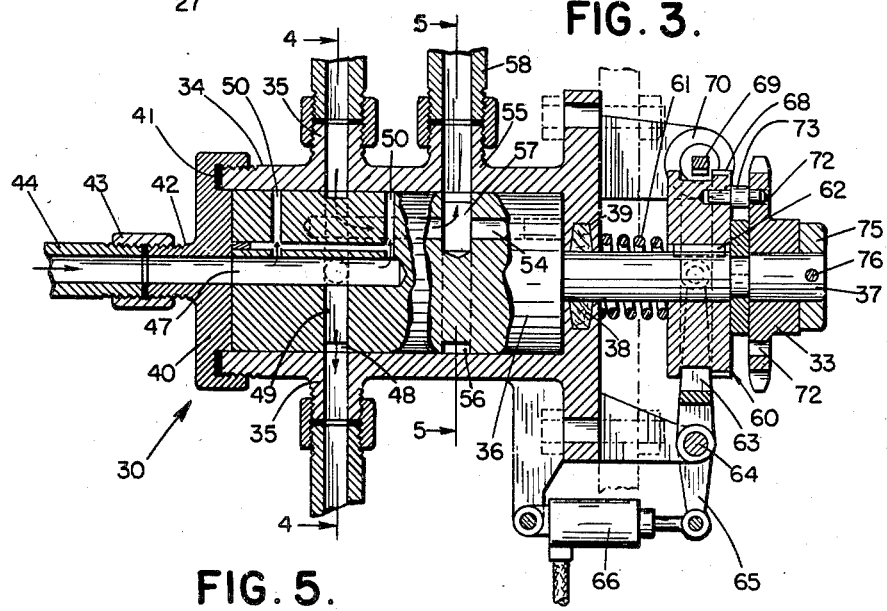
Fig. 3 is a side elevational view partly in section showing the structure of the rotary valve and reversing mechanism.
Figure 5:
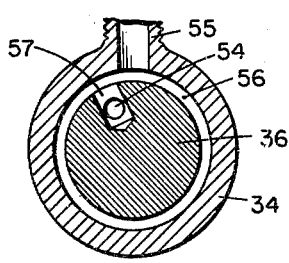
Fig. 5 is a cross-sectional view taken on the line 5—5 of Fig. 3.

The invention will be described in relation to the operation of a tractor having independent drives on each of the two rear wheels, but it will be understood that my motor may be used in other arrangements and for other purposes.

In general, the tractor consists of a frame 11 upon which are mounted front wheels 12 adapted to be used for steering the vehicle through the steering wheel 13. The rear wheels 14 of the tractor are independently mounted on the frame and separately driven by the fluid motor means of my invention, as will be described in detail below. Mounted upon the frame 11 of the tractor is a primary motive power source 15 which may be a gasoline motor of conventional type, having a power shaft 16 which drives a liquid pressure pump 17 through the flexible coupling 18. The return liquid from the cylinders of my engine is delivered back to the reservoir 19 through the return line 50 and thence to the liquid pressure pump 17, the higher pressure liquid being delivered from the pump through the outlet pipe 20.

By way of example, my radial motor as shown is provided with four single acting cylinders, although it will be understood that three or more cylinders may be used, with suitable rearrangements of the valve structure and conduits to correspond to the selected number of cylinders. The cylinders 21 are arranged radially around the drive shaft 22 which is directly connected to the hub of one of the rear wheels 14, the shaft being journaled in bearings 23 attached to the frame 11, a single crank 24 being provided on this shaft, to which the outer ends of the four piston rods 25 are rotatably connected. The outer or fixed ends of the cylinders 21 are attached to brackets 26 on the frame 11, by means of the pivot pins 27 which permit the oscillating angular movement of the cylinders corresponding to the position of the crank 24. Fluid, preferably liquid, under pressure is delivered to the ports 29 of each of the single acting cylinders through the flexible tubes 28 connected to corresponding valve outlet ports 35 of the rotary valve 30, which is driven synchronously with the drive shaft 22 by the sprocket chain 32 driving the sprocket 33 operatively connected to the rotary valve shaft 37.

The rotary valve 30 consists of a valve body 34 having valve outlet ports 35 arranged radially around the valve body in positions corresponding to the radial angular positions of the power cylinders 21. That is, with the four cylinder engine herein described, the outlet ports 35 of the valve are arranged 90° apart around the valve body 34. The cylindrical cavity of the valve body 34 is accurately fitted to the rotary valve cylinder 36, which is adapted to be rotated by the valve shaft 37 extending through a closed end of the valve body 34, packing rings 38 being provided around the shaft in the recess 39 of the valve body. The opposite end of the valve body is closed by the cap 40 which is screw-threaded for attachment to the threaded end of the body and is provided with compression packing rings 41, the inside end surface of the cap 40 being accurately fitted to the end surface of the rotary valve cylinder 36. A valve inlet port 42 is provided in the cap 40 in its central portion aligned with the axis of the valve cylinder 36, this port 42 being connected by the coupling 43 to the pipe 44 which leads to the hand-control valve 45 for the operation of one drive wheel, the control valves being conveniently located adjacent the steering wheel 13 and the driver's seat 46. The rotary valve cylinder 36 is provided with an axial hole 47 extending from the end of the cylinder which contacts the cap 40, to a point in or slightly beyond the peripheral plane of the multiple ports 35 in the valve body. The axial hole 47 is connected to the groove 48 in the periphery of the valve cylinder 36 by the hole 49, this groove being positioned to coincide with the openings of the ports 35 in the inside surface of the valve body, the groove 48 extending a little less than half-way around the periphery of the cylinder 36. Counterbalancing holes 50 with blind openings adjacent the cylindrical wall of the valve body 34, and positioned diametrically opposite the hole 49 are provided to permit the easy turning of the valve cylinder. A corresponding discharge groove 51 for fluid discharged from the cylinders is provided in the opposite half of the valve cylinder in the same peripheral plane perpendicular to the axis as the groove 48, the groove being discontinuous around the cylinder, interrupted by two closed portions 52 arranged at 180° apart, each closed portion having an arcuate length equal to or slightly greater than the width of the ports 35 at the openings in the valve body. The discharge groove 51 is connected to a hole 53 by a connecting hole 54 disposed in the valve cylinder 36 parallel to but not in the axis of the cylinder and extending toward the end surface of the valve cylinder adjacent the closed end of the valve body 34. The valve body 34 is provided with a single discharge port 55 which is connected to the discharge groove 56 in the valve cylinder extending completely around the cylinder, the said groove being connected to the hole 54 by a connecting hole 57. The discharge port 55 is connected to the return liquid line 58 leading to the reservoir 19.

It will thus be understood that high pressure liquid enters the rotary valve through the inlet port 42 through the axial hole 47 and is delivered to the groove 48 through the connecting hole 49 and is distributed to the outlet ports 35 and thence in sequence to the cylinders, the groove 48 being hydraulically connected to not more than two of the outlet ports (in the four cylinder arrangement shown) at any time. The discharge groove 51 receives low pressure liquid in sequence from the cylinders through other ports 35, not more than two of which are connected to the groove at any one time (in the four cylinder arrangement), and carries the low pressure liquid from this groove 51 through the holes 53, 54, 57, and the discharge groove 56 and finally out through the discharge port 55 to the pipe line 58 leading to the reservoir and pressure pump system.

The reversing mechanism associated with the rotary valve 30 consists of a driving disk 60 which is adapted to slide axially on the shaft 37 against the coil spring 61 which abuts the closed end of the valve body 34, a key 62 being provided between the driving disk and the shaft 37 so that the disk will remain rotatably connected to the valve shaft 37. A yoke 63 is pivoted on the pivot 64, an extension arm 65 thereof acting as a lever to operate the yoke to move the driving disk laterally on the shaft 37 against the spring 61, the extension arm being actuated, for example, by a small hydraulic jack 66 which is controlled at the driver's position by the hand valve 67. The driving disk 60 is provided with edge peripheral teeth 68 which are at times engaged by the teeth of the rack bar 69 which is adapted to be reciprocated by the double-acting hydraulic jack 70 which is controlled by the manual two-way valve 71. The face of the driving disk 60 is provided with a drive pin 73 which is adapted to be engaged in one of the two holes 72 spaced at 180° apart in the adjoining face of the rotary valve sprocket 33, this sprocket being free to rotate on the end of the valve shaft 37, held in place by the collar 75 attached by the pin 76 to the shaft 37. When it is desired to reverse the cycle of the valve action and the direction of rotation of the fluid motor, the driving disk 60 is shifted laterally on the shaft 37 by means of the hydraulic jack 66 operating through the extension lever 65 on the yoke 63, until the drive pin 73 fixed in the face of the driving disk 60 is disengaged from the hole 72 in the face of the sprocket 33. The teeth of the rack bar 69 are thus brought into engagement with the teeth 68 on the periphery of the driving disk 60. The rack is then actuated by the jack 70 to rotate the disk through 180° allowing the drive pin 73 to be engaged in the opposite hole 72, the parts being returned to their normal position on the shaft 37 by the pressure of the compressed spring 61.

The hydraulic fluid under pressure is delivered to the rotary valve and distributed consecutively to the respective single acting cylinders to operate the crank and turn the shaft and thus drive one wheel of the tractor. Since the inlet grooves in the rotary valve extend over the ports leading to two adjacent cylinders, there is a power overlap, so that power is delivered to the crank shaft continuously. Since the system is essentially a closed hydraulic system, the liquid pressure pump 17 may be operated continuously by the gas engine 15, the control of the liquid under pressure to the motor being through the control valve 45 which is conveniently arranged near the operator's seat. As shown diagrammatically in Fig. 6, a relief valve 78 adjusted to a suitable maximum pressure is included in the system so that the liquid under pressure, if not used in the engine, is merely recirculated back to the liquid reservoir 19. The same liquid pressure system may be used for both drive wheels in the case of the use in driving a tractor with separate control valves being desirable so that the hydraulic motors on either drive wheel may be separately controlled.

The advantages of my motor will be apparent. The valve structure is extremely simple, self-sealing, and self-balancing. It is intended that the liquid pressures used in this system shall be very high so that upon occasion, great force may be applied to the crank shaft through the cylinders. The arrangement completely eliminates the clutch and transmission mechanisms involved in the usual tractor drives. As a motor, the device is highly efficient in the conversion of the energy of liquid under high pressure to rotary motion.

I claim:

1. A fluid pressure engine comprising, a frame, multiple power radially disposed cylinders each having a port, a reciprocating piston in each of said cylinders, a crank shaft journaled on said frame and having a crank, means connecting each of said pistons to the crank of said crank shaft; a rotary valve adapted for synchronous rotation with said shaft, said rotary valve comprising a valve body having a cylindrical cavity, a valve cylinder closely fitting in said cavity, said cylinder having multiple ports corresponding in number to the number of power cylinders arranged in a diametral plane and also having a valve discharge port arranged in a different diametral plane, said valve cylinder having a concentric valve shaft extending through one end-wall of said body and having a first peripheral groove with two partitions spaced 180° apart, said groove being disposed to coincide with the multiple ports of said body, one-half of said groove being a pressure fluid inlet connected to a valve inlet port arranged in said valve body, and also having an outlet peripheral groove disposed to coincide with said discharge port in said body, said outlet groove being connected for hydraulic liquid flow by connecting holes in said valve cylinder with the other half of said first peripheral groove, and means on said valve shaft for turning said valve cylinder in synchronism with the rotation of said crank shaft.

2. A fluid pressure engine comprising, a frame, multiple radially disposed power cylinders each having a port, a reciprocating piston in each of said cylinders, a crank shaft journaled on said frame and having a crank, means connecting each of said pistons to the crank of said crank shaft; a rotary valve adapted for synchronous rotation with said shaft, said rotary valve comprising a valve body having a cylindrical cavity, a valve cylinder closely fitting in said cavity, said cylinder having multiple ports corresponding in number to the number of power cylinders arranged in a diametral plane and also having a valve discharge port arranged in a different diametral plane, said valve body having openings at times contiguous to the ports in said valve cylinder, and said valve cylinder having a concentric valve shaft extending from one end through one end-wall of said body and having a first peripheral groove with two partitions spaced 180° apart, said groove being disposed to coincide with the multiple ports of said body, one-half of said groove being a pressure fluid inlet connected by a radial hole and an axial hole to a valve inlet port arranged in the other end-wall of said valve body, and also having an outlet peripheral groove disposed to coincide with said discharge port in said body, said outlet groove being connected for hydraulic liquid flow by connecting holes in said valve cylinder with the other half of said first peripheral groove, means on said valve shaft for turning said valve cylinder in synchronism with the rotation of said crank shaft, conduits connecting each of said power cylinder ports with a corresponding port in said rotary valve, hand control valved conduit means for carrying high pressure liquid to said rotary valve inlet port, and conduit means connected to said rotary valve discharge port for carrying away lower pressured liquid.

3. In a fluid pressure motor having, multiple single action radially disposed power cylinders with pistons connected to a common crank shaft, a rotary valve adapted for synchronous rotation with said shaft, said rotary valve comprising a valve body having a cylindrical cavity, a valve cylinder closely fitting in said cavity, said cylinder having multiple ports corresponding in number to the number of power cylinders arranged in a diametral plane and also having a valve discharge port arranged in a different diametral plane, a valve cylinder having a concentric valve shaft extending through one end-wall of said body and having a first peripheral groove with two partitions spaced 180° apart, said groove being disposed to coincide with the multiple ports of said body, one-half of said groove being a pressure fluid inlet connected to a valve inlet port arranged in said valve body, and also having an outlet peripheral groove disposed to coincide with said discharge port in said body, said outlet groove being connected for hydraulic liquid flow by connecting holes in said valve cylinder with the other half of said first peripheral groove, and means on said valve shaft for turning said valve cylinder in synchronism with the rotation of said crank shaft.

4. In a fluid pressure motor having, multiple single action radially disposed power cylinders with pistons connected to a common crank shaft, a rotary valve adapted for synchronous rotation with said shaft, said rotary valve comprising a valve body having a cylindrical cavity, a valve cylinder closely fitting in said cavity, said cylinder having multiple ports corresponding in number to the number of power cylinders arranged in a diametral plane and also having a valve discharge port arranged in a different diametral plane, said valve cylinder having a concentric valve shaft extending through one end-wall of said body and having a first peripheral groove with two partitions spaced 180° apart, said groove being disposed to coincide with the multiple ports of said body, one-half of said groove being a pressure fluid inlet connected to a valve inlet port arranged in said valve body, and also having an outlet peripheral groove disposed to coincide with said discharge port in said body, said outlet groove being connected for hydraulic liquid flow by connecting holes in said valve cylinder with the other half of said first peripheral groove, means on said valve shaft for turning said valve cylinder in synchronism with the rotation of said crank shaft, and reversing means for said motor including means for turning the rotary valve cylinder independently of the crank shaft through a half revolution.

JOHN H. FEASTER.

REFERENCES CITED

The following references are of record in the file of this patent:

UNITED STATES PATENTS

| Number | Name | Date |
| --- | --- | --- |
| 651,158 | Bergmann | June 5, 1900 |
| 732,908 | Thomson | July 7, 1903 |
| 832,518 | Wolcott | Oct. 2, 1906 |
| 1,229,076 | Hayes | June 5, 1917 |
| 1,963,091 | Jenkins | June 19, 1934 |

FOREIGN PATENTS

| Number | Country | Date |
| --- | --- | --- |
| 481,093 | Great Britain | Mar. 7, 1938 |